(12) United States Patent
Park

(10) Patent No.: US 11,403,942 B2
(45) Date of Patent: Aug. 2, 2022

(54) REMOTE DRIVING METHOD USING ANOTHER AUTONOMOUS VEHICLE IN AUTOMATED VEHICLE AND HIGH SYSTEMS

(71) Applicant: LG ELECTRONICS INC., Seoul (KR)

(72) Inventor: Yongsoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 363 days.

(21) Appl. No.: 16/483,953

(22) PCT Filed: Jun. 14, 2019

(86) PCT No.: PCT/KR2019/007168
§ 371 (c)(1),
(2) Date: Aug. 6, 2019

(87) PCT Pub. No.: WO2020/251091
PCT Pub. Date: Dec. 17, 2020

(65) Prior Publication Data
US 2021/0366278 A1  Nov. 25, 2021

(51) Int. Cl.
*B60W 60/00* (2020.01)
*G08G 1/0967* (2006.01)
(Continued)

(52) U.S. Cl.
CPC ... *G08G 1/096725* (2013.01); *B60W 60/0025* (2020.02); *G05D 1/0285* (2013.01); *G08G 1/096791* (2013.01); *H04L 67/125* (2013.01)

(58) Field of Classification Search
CPC ...... G08G 1/096725; G08G 1/096791; B60W 60/0025; G05D 1/0285; H04L 67/125
See application file for complete search history.

(56) References Cited

U.S. PATENT DOCUMENTS

2016/0278006 A1* 9/2016 Lee .................. H04W 12/04
2017/0318622 A1* 11/2017 Yi ..................... H04W 88/04
(Continued)

FOREIGN PATENT DOCUMENTS

CN       108022441 A  *  5/2018  ........... G05D 1/0022
CN       109116720 A  *  1/2019  ............... G05B 9/03
(Continued)

*Primary Examiner* — Vivek D Koppikar
*Assistant Examiner* — Jeffrey R Chalhoub
(74) *Attorney, Agent, or Firm* — Birch, Stewart, Kolasch & Birch, LLP

(57) ABSTRACT

A remote driving method using another autonomous device of a network in automated vehicle & highway systems can including transmitting, to a second device, a remote driving request message, when a message indicating impossibility of communication between a first device and a terminal connected to the network is received from the terminal, receiving, from the second device, a success response message for establishment of communication for remote driving of the first device, and transmitting, to the first device, a remote driving start message. One or more of an autonomous vehicle, a user terminal and a server of the present invention can be associated with artificial intelligence modules, drones (unmanned aerial vehicles (UAVs)), robots, augmented reality (AR) devices, virtual reality (VR) devices, devices related to 5G service, etc.

9 Claims, 18 Drawing Sheets

(51) Int. Cl.
*G05D 1/02* (2020.01)
*H04L 67/125* (2022.01)

(56) References Cited

U.S. PATENT DOCUMENTS

2018/0220280 A1\* 8/2018 Baghel .................. H04L 1/1671
2018/0259974 A1    9/2018 Lei et al.

FOREIGN PATENT DOCUMENTS

| KR | 10-1781048 B1    | 9/2017 |
| KR | 10-2018-0043021 A | 4/2018 |
| KR | 10-2018-0057386 A | 5/2018 |
| KR | 10-2018-0067889 A | 6/2018 |
| KR | 10-2018-0076567 A | 7/2018 |
| KR | 10-2019-0004567 A | 1/2019 |
| KR | 10-2019-0065927 A | 6/2019 |

\* cited by examiner

[FIG. 1]
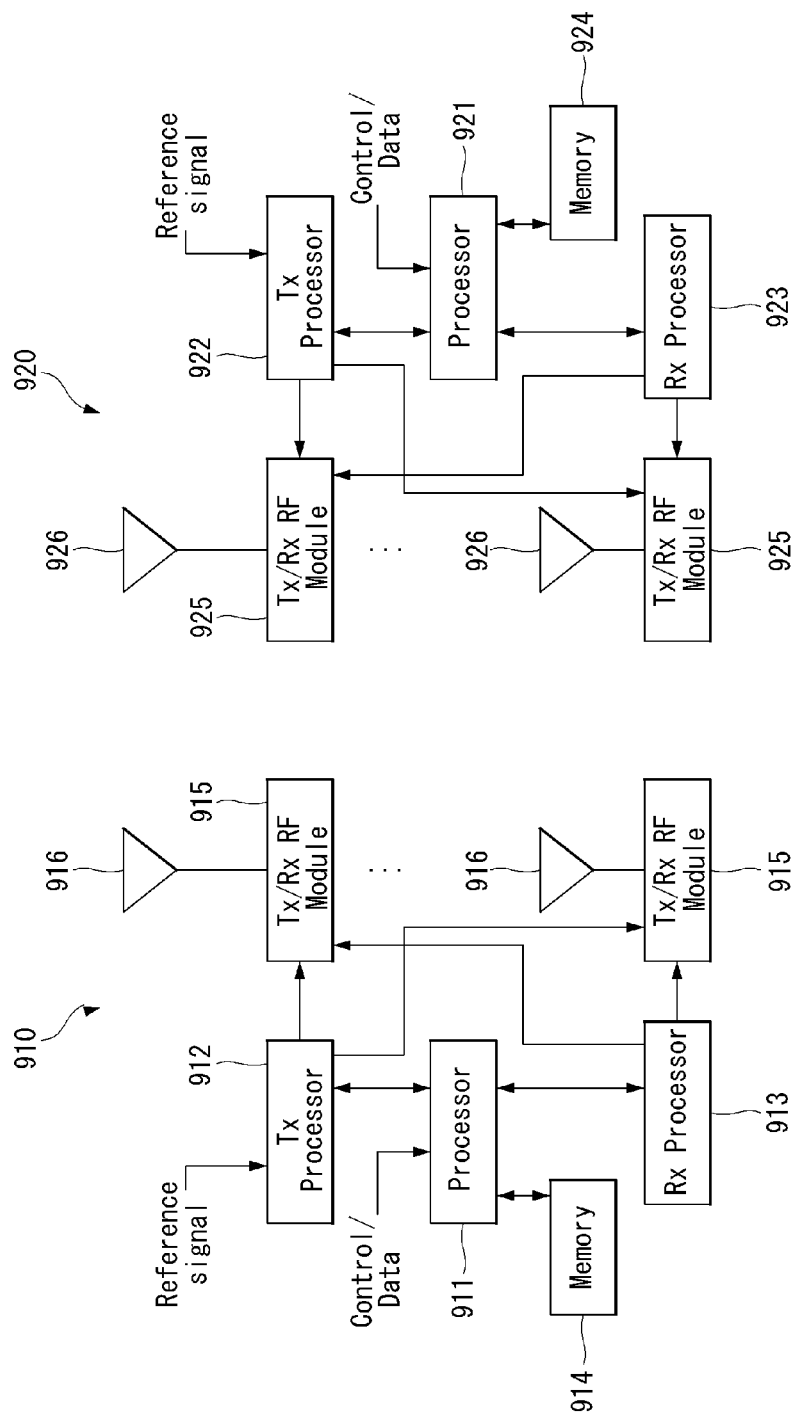

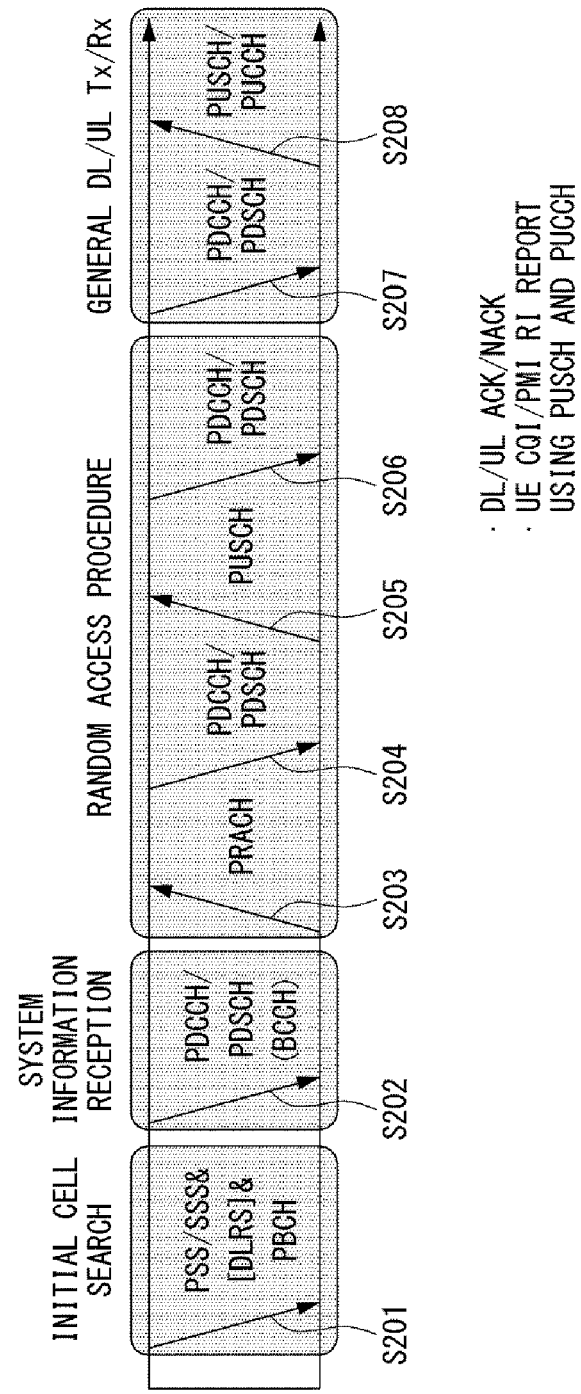
[FIG. 2]

[FIG. 3]
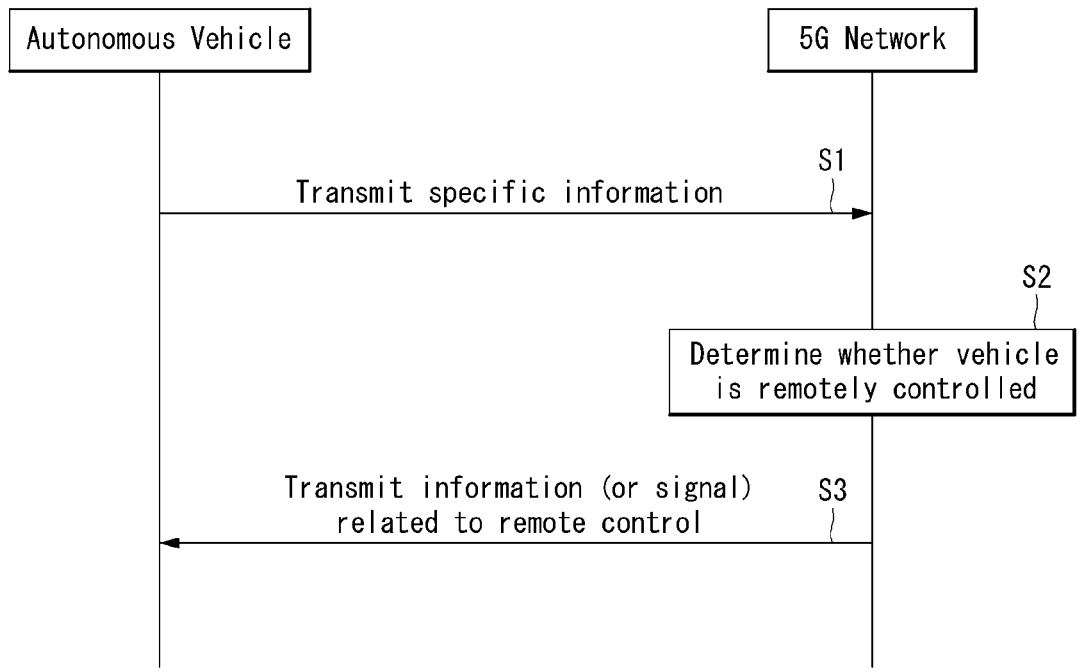
[FIG. 4]
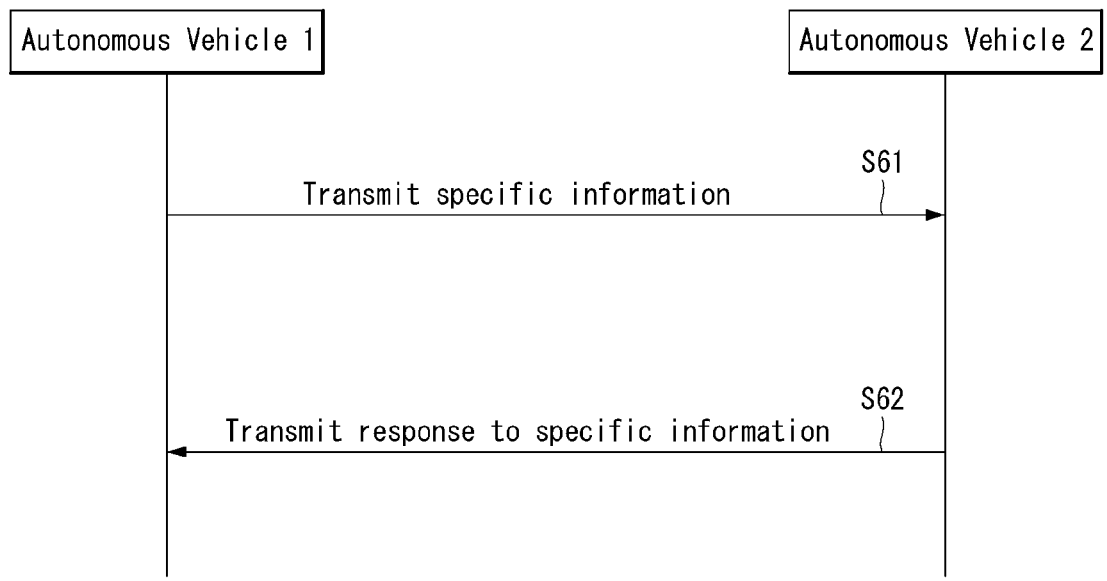

[FIG. 5]
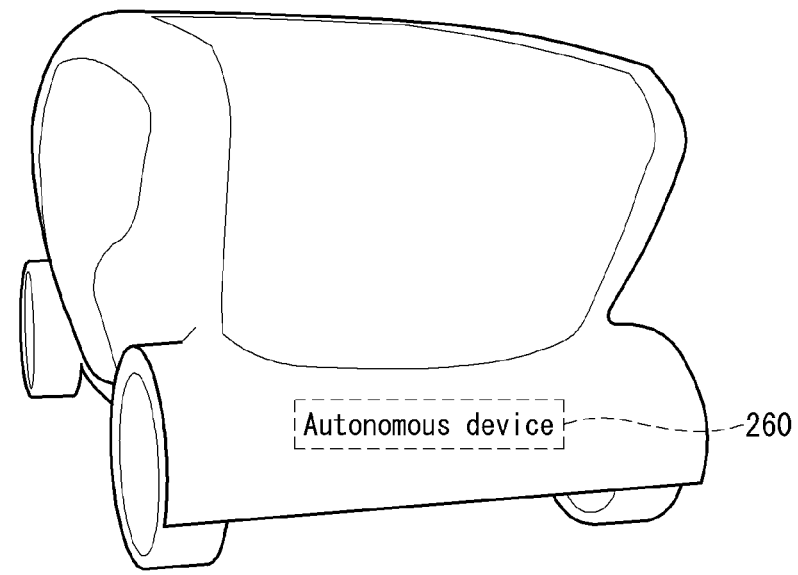
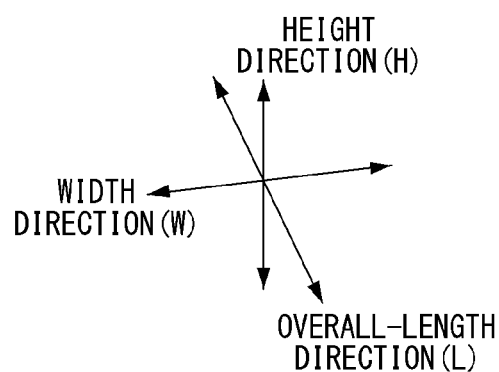

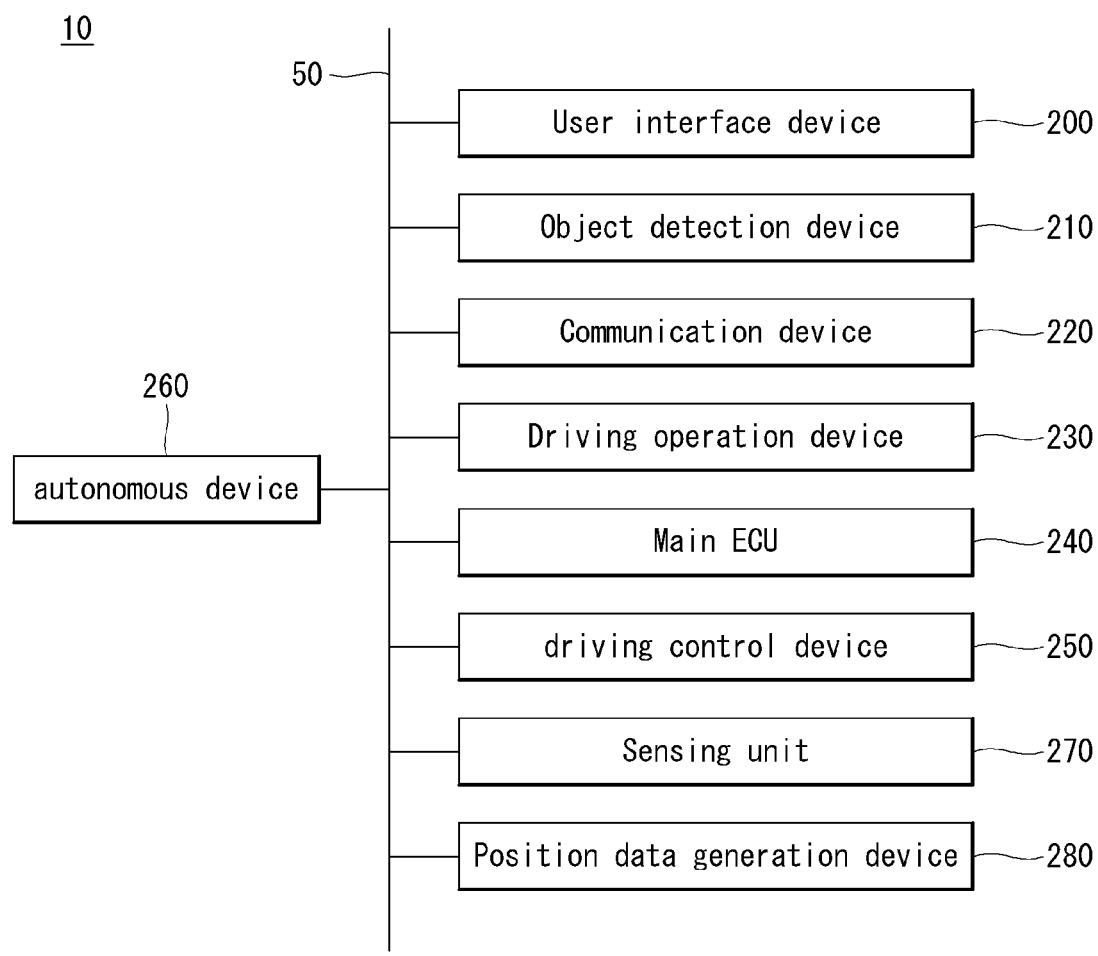

[FIG. 7]
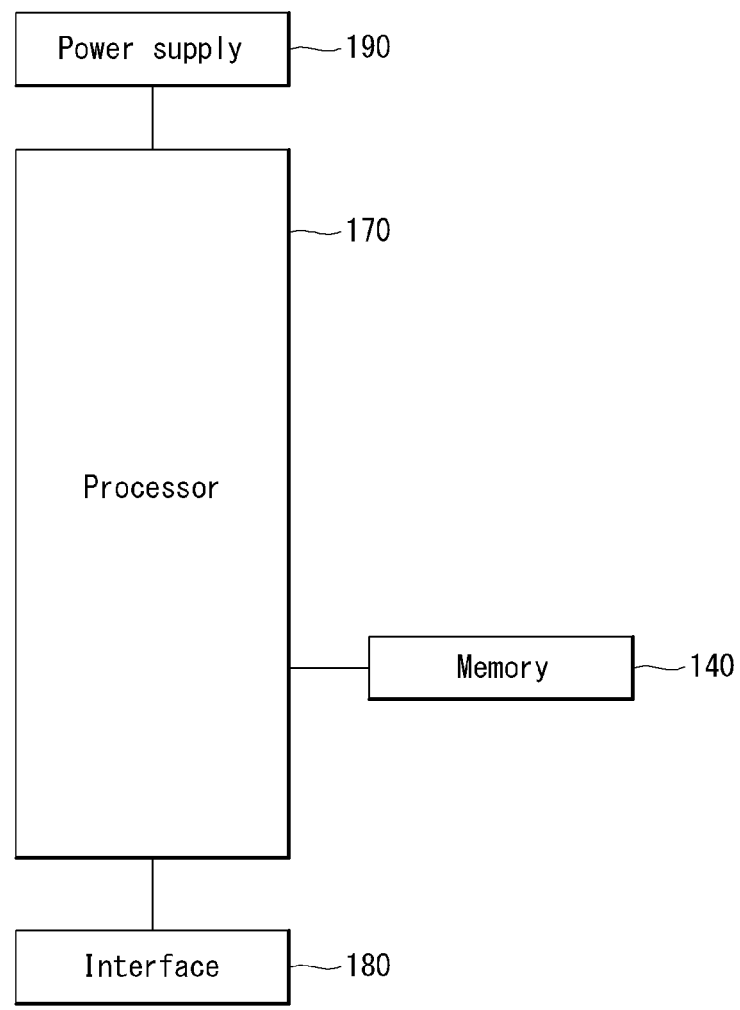

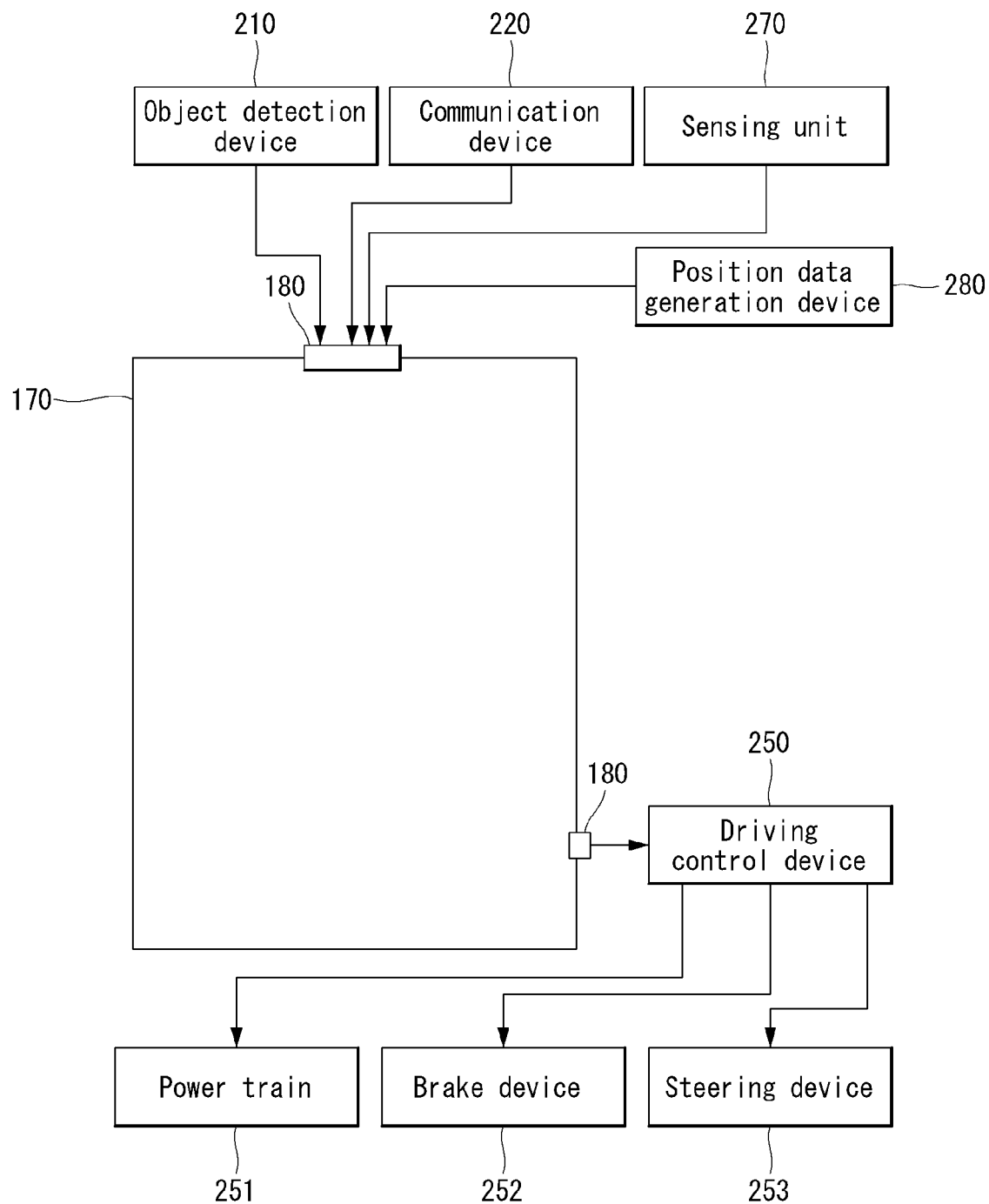
[FIG. 8]

[FIG. 9]
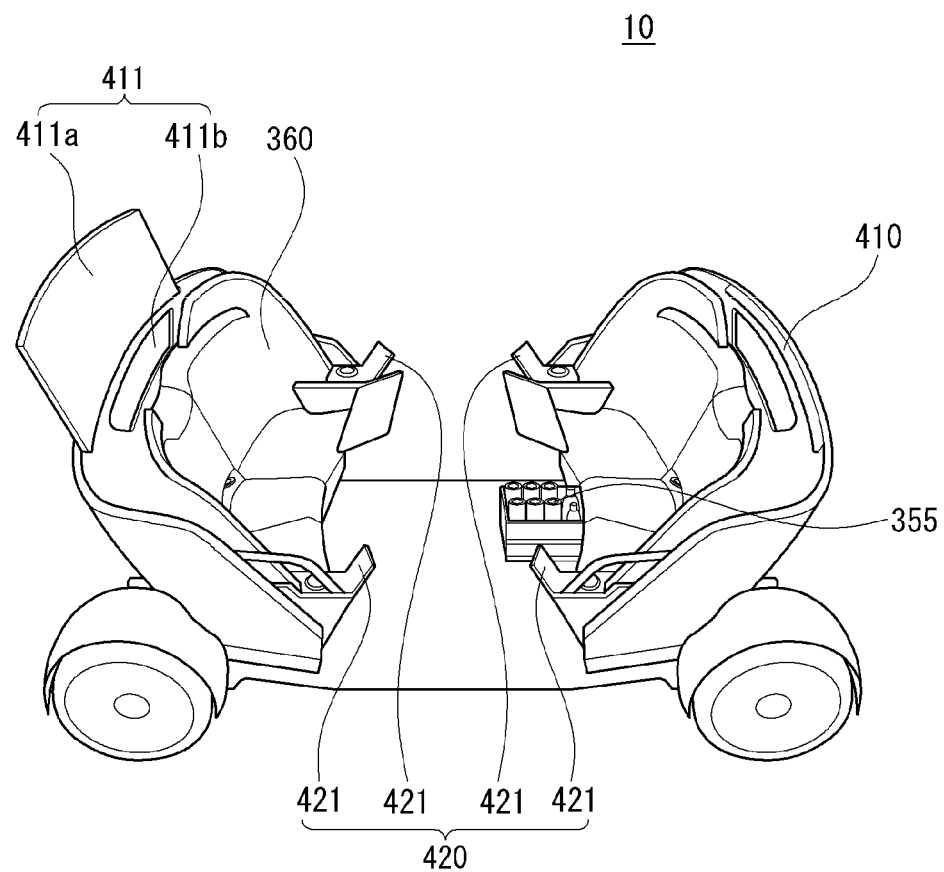

[FIG. 10]
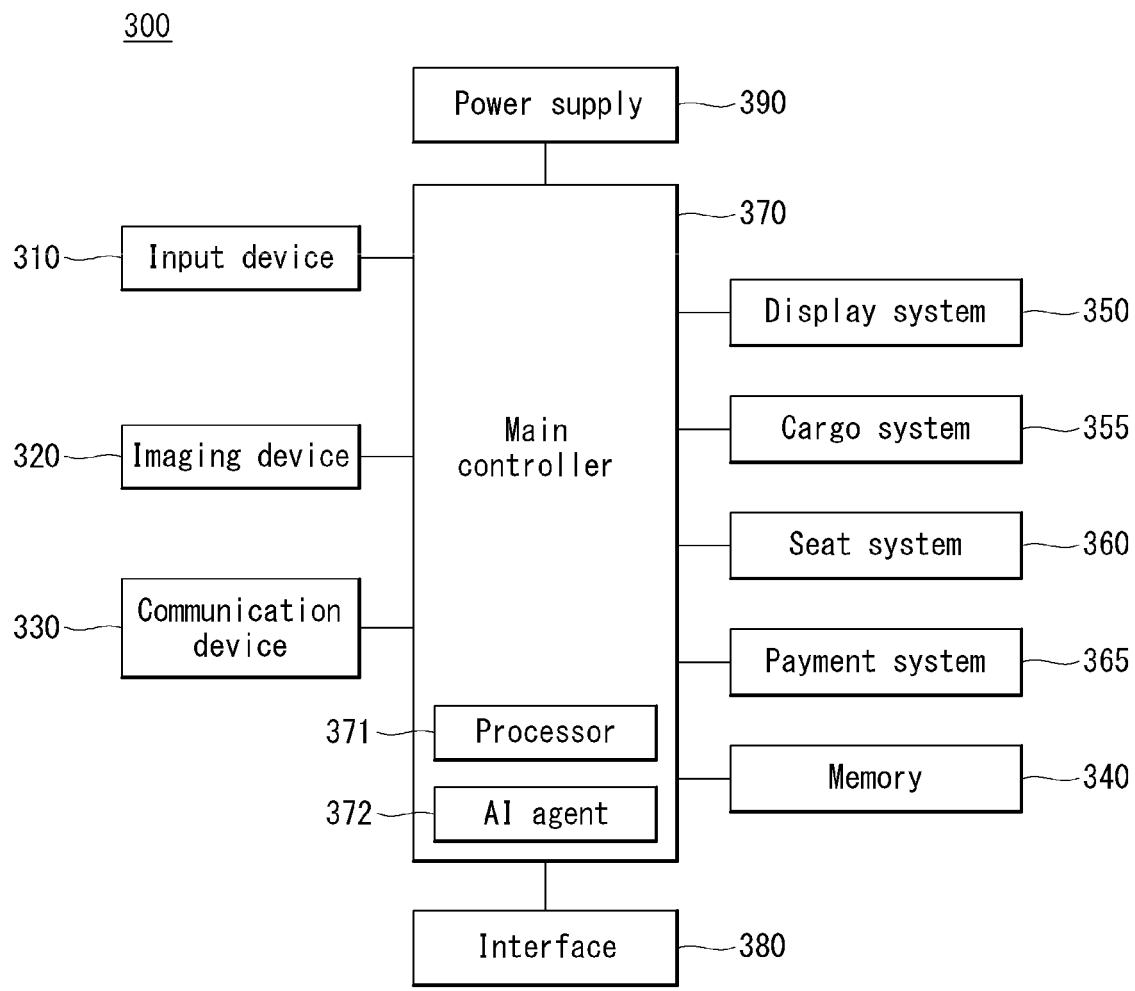

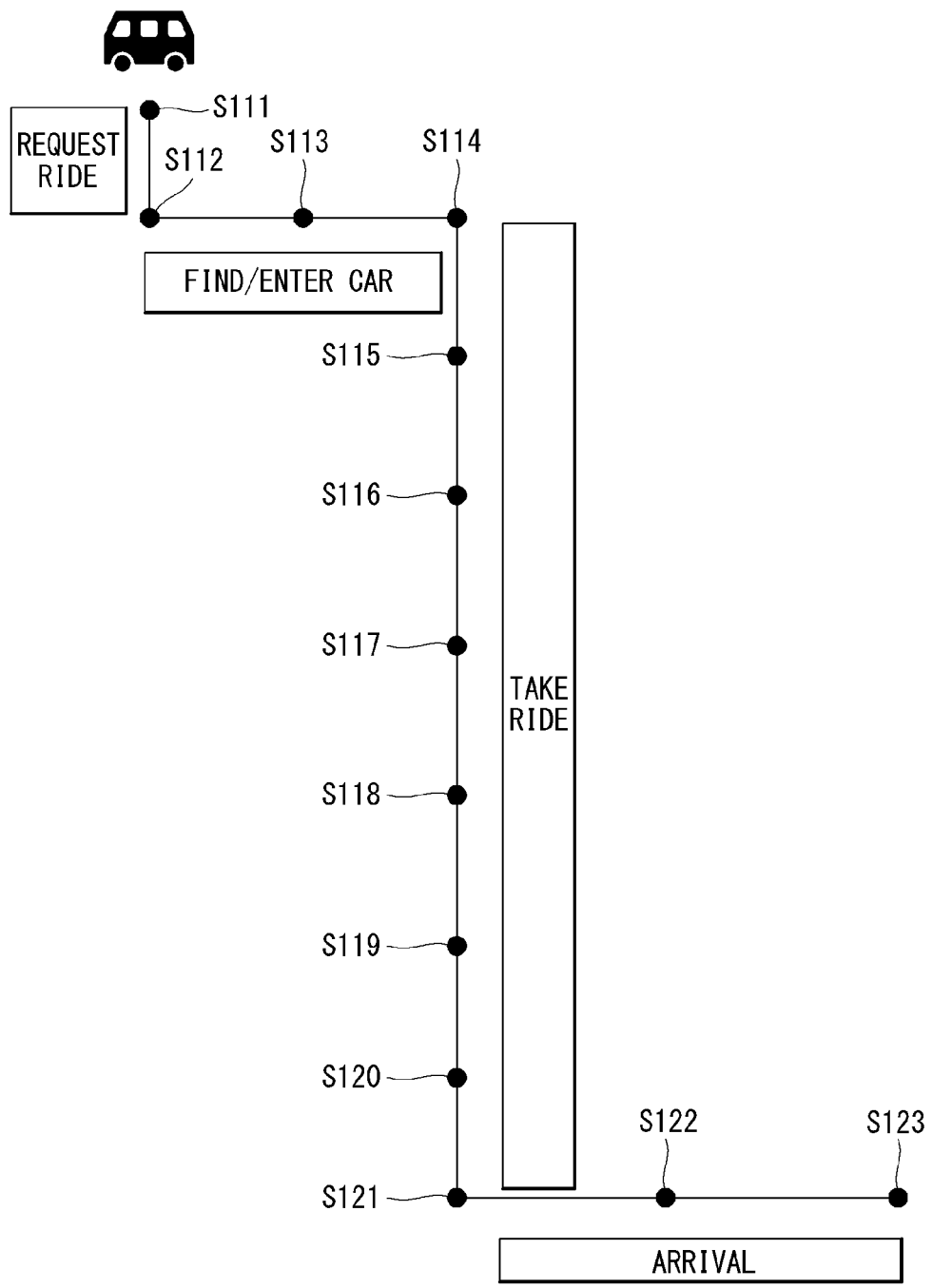

[FIG. 12]
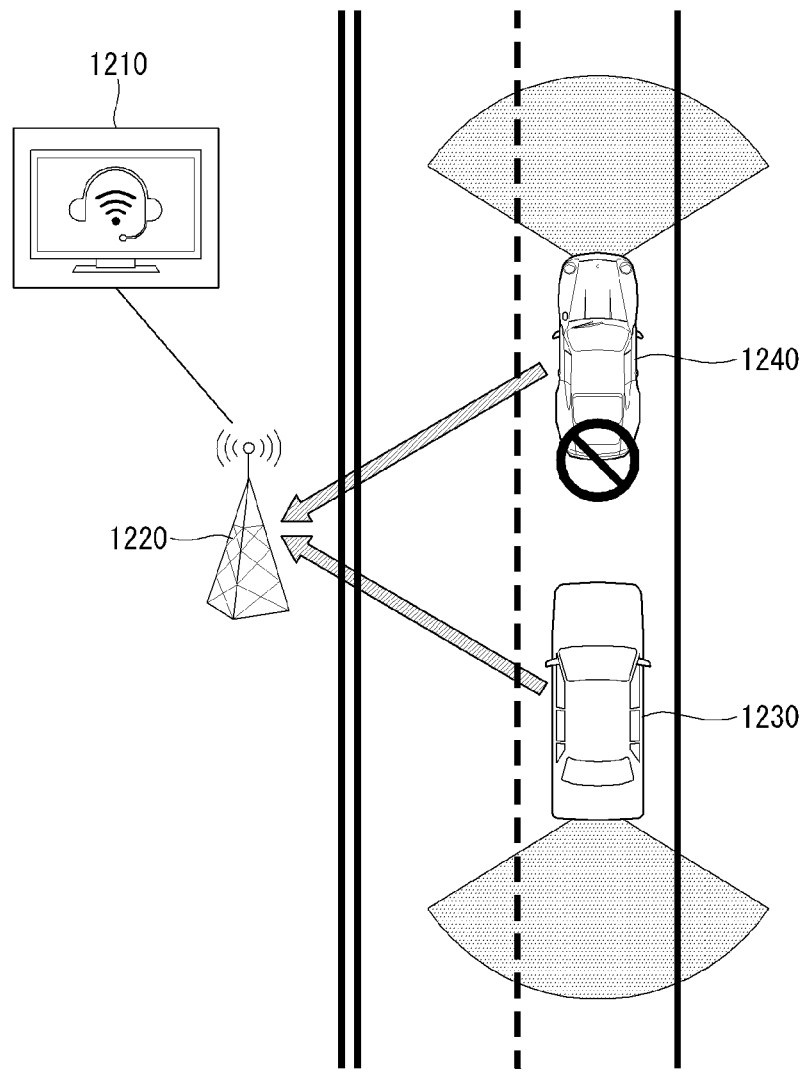

[FIG. 13]
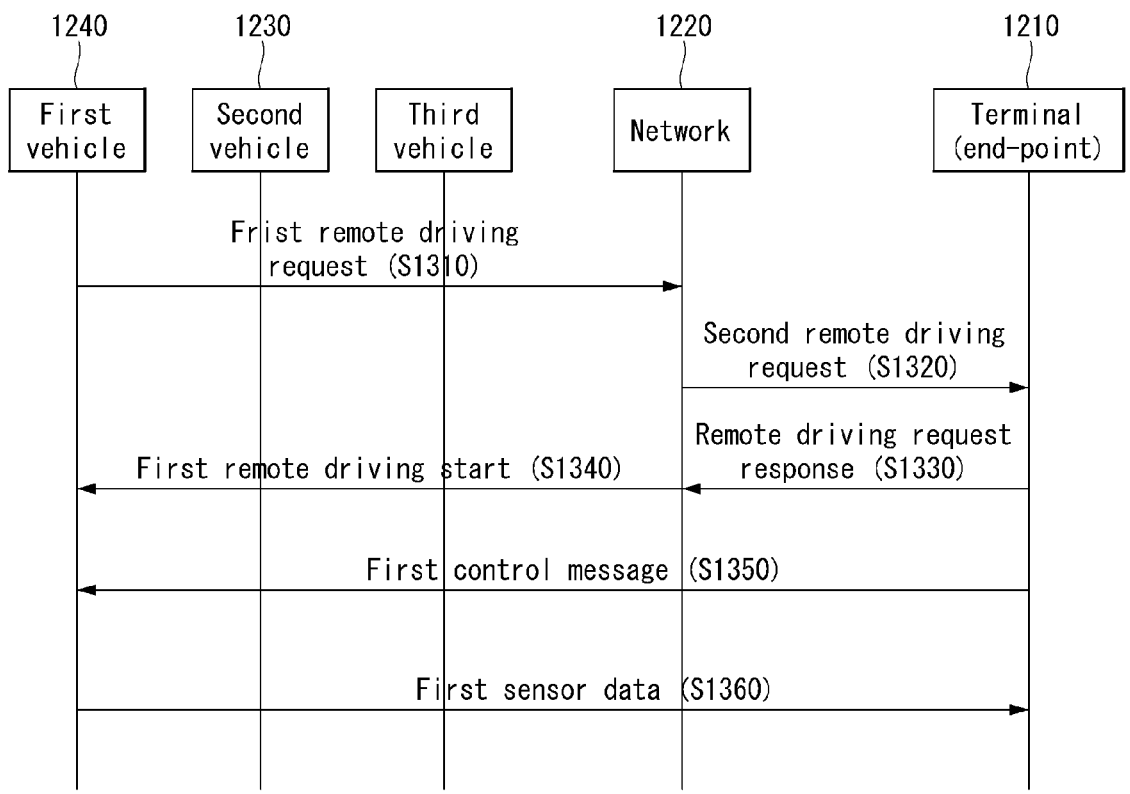
[FIG. 14]
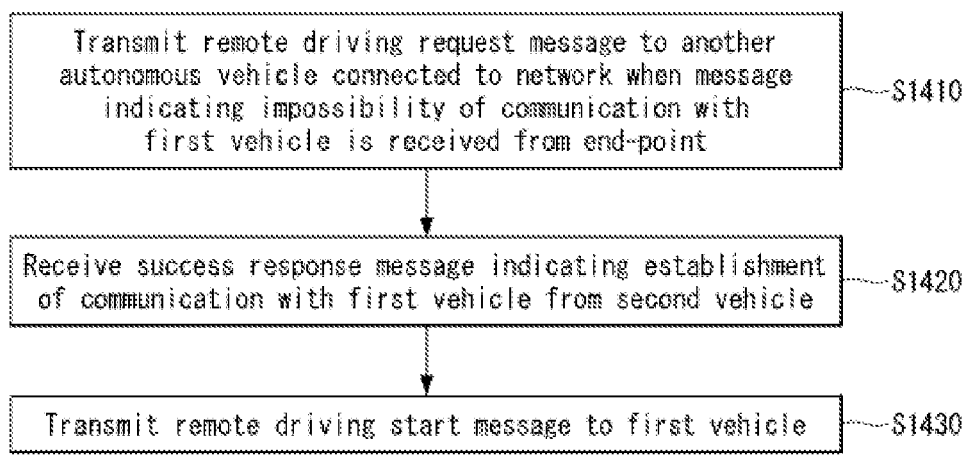

[FIG. 15]
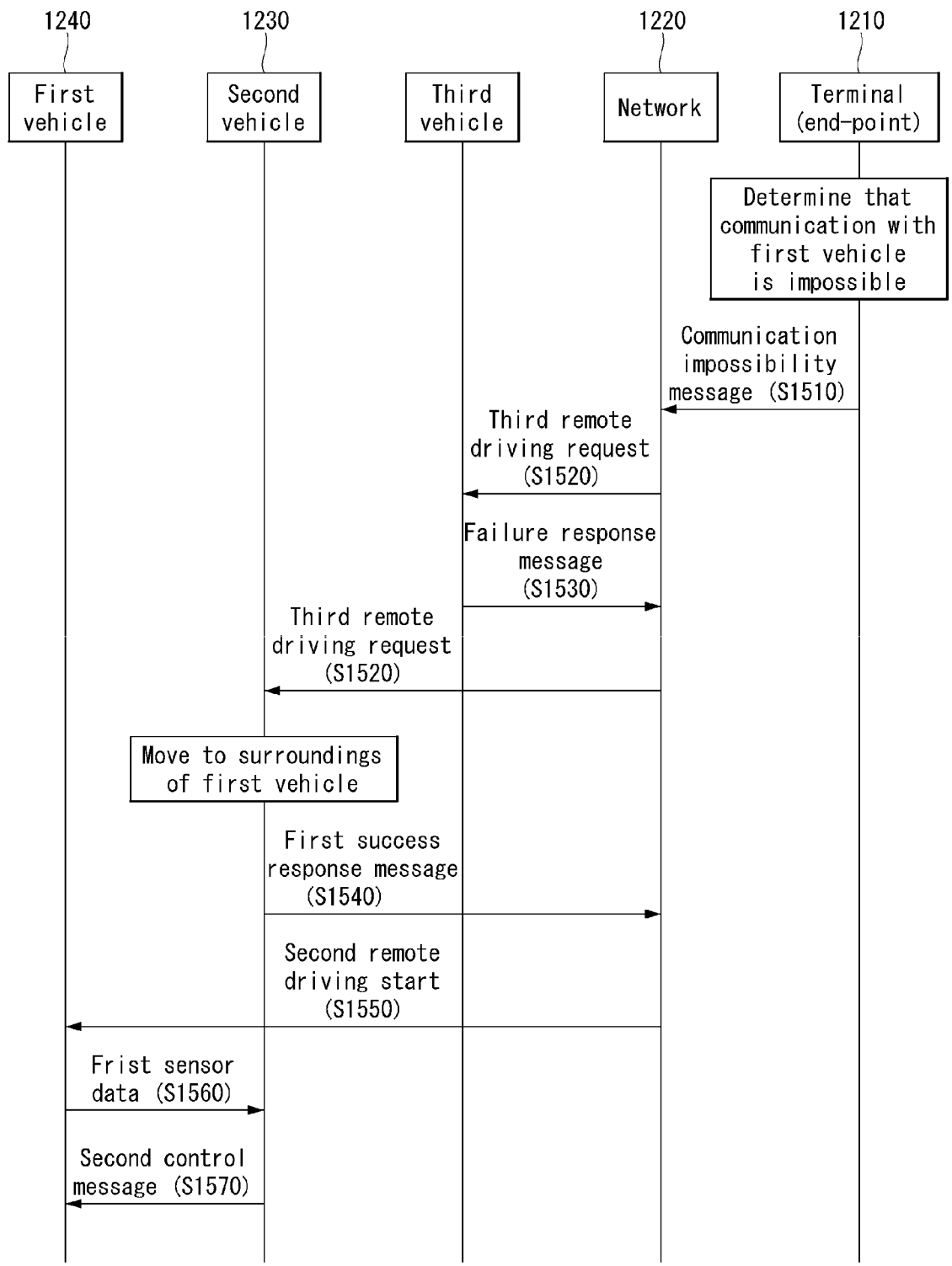

[FIG. 16]
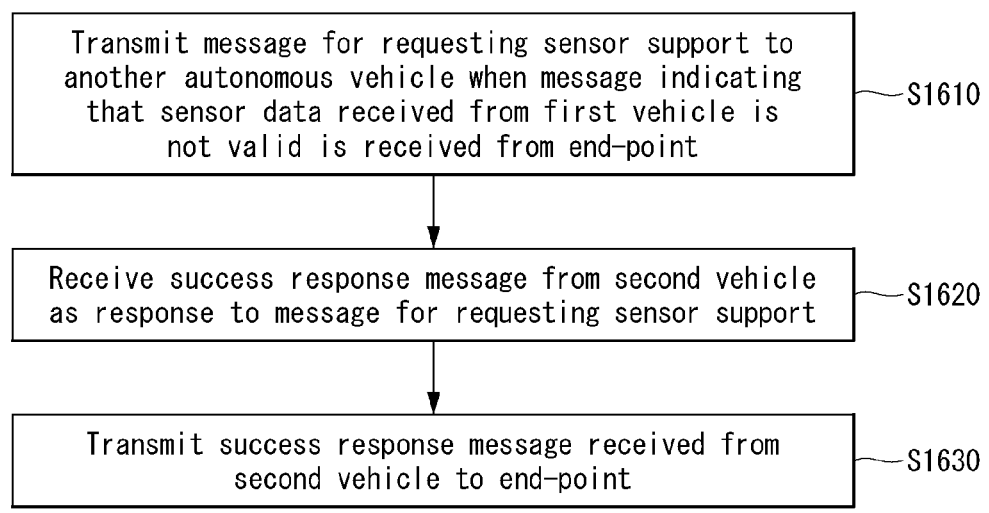

[FIG. 17]
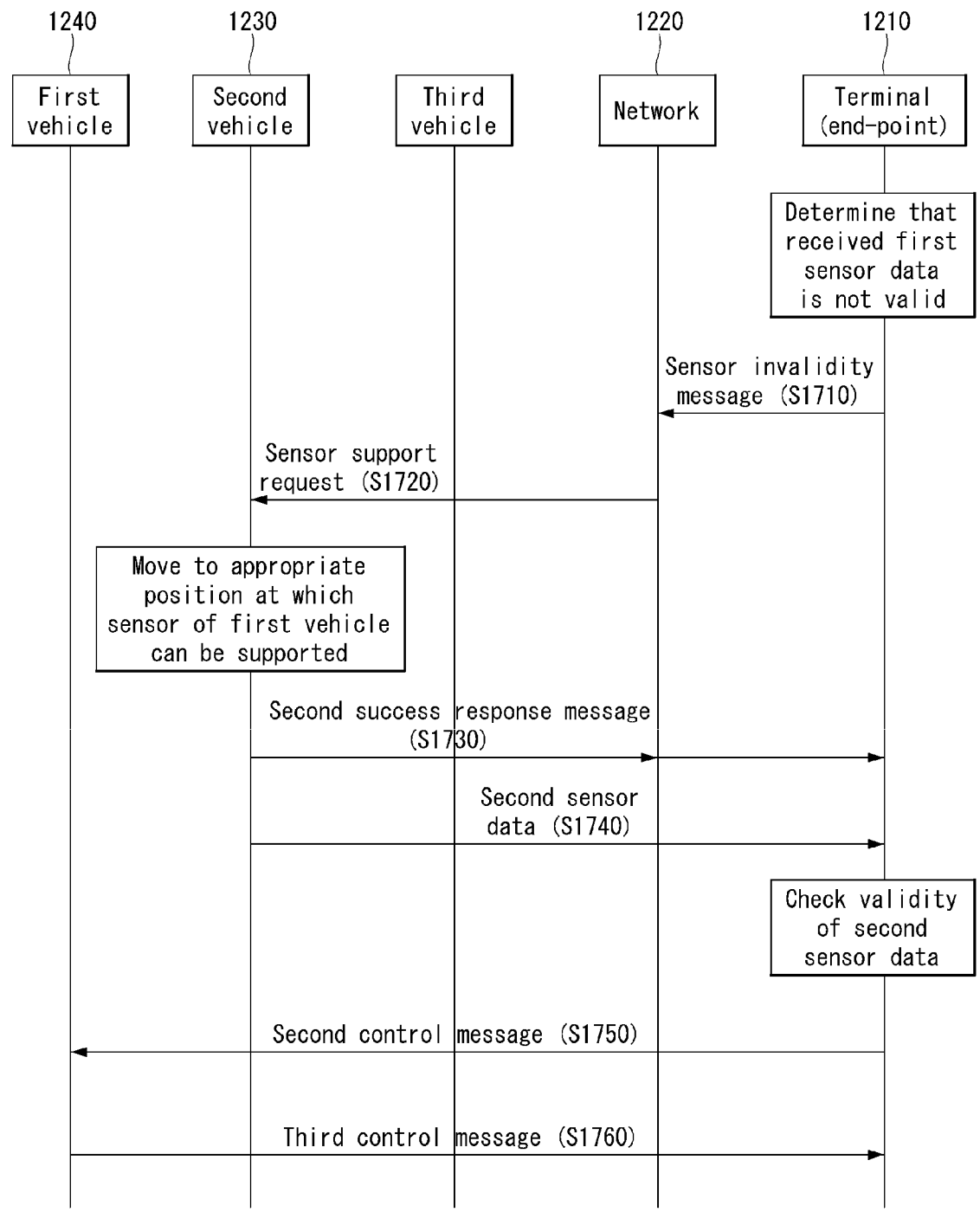

[FIG. 18]
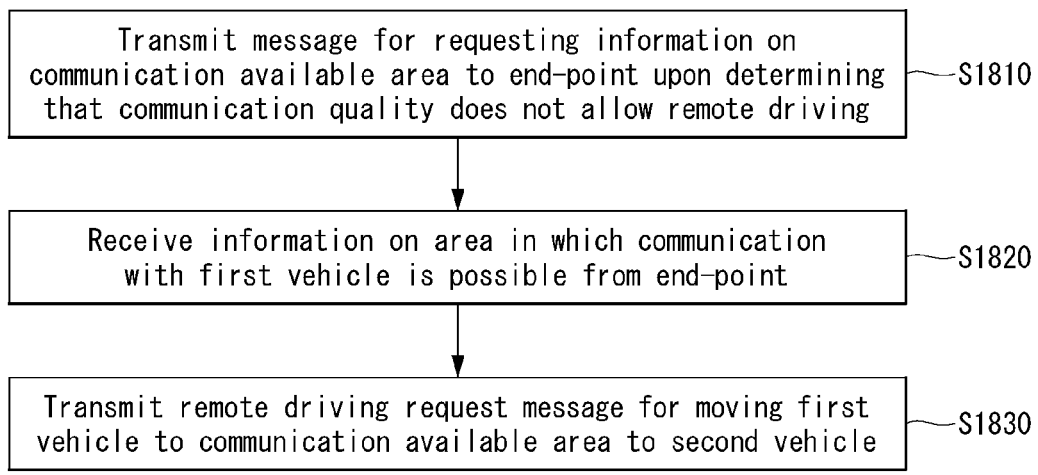

[FIG. 19]
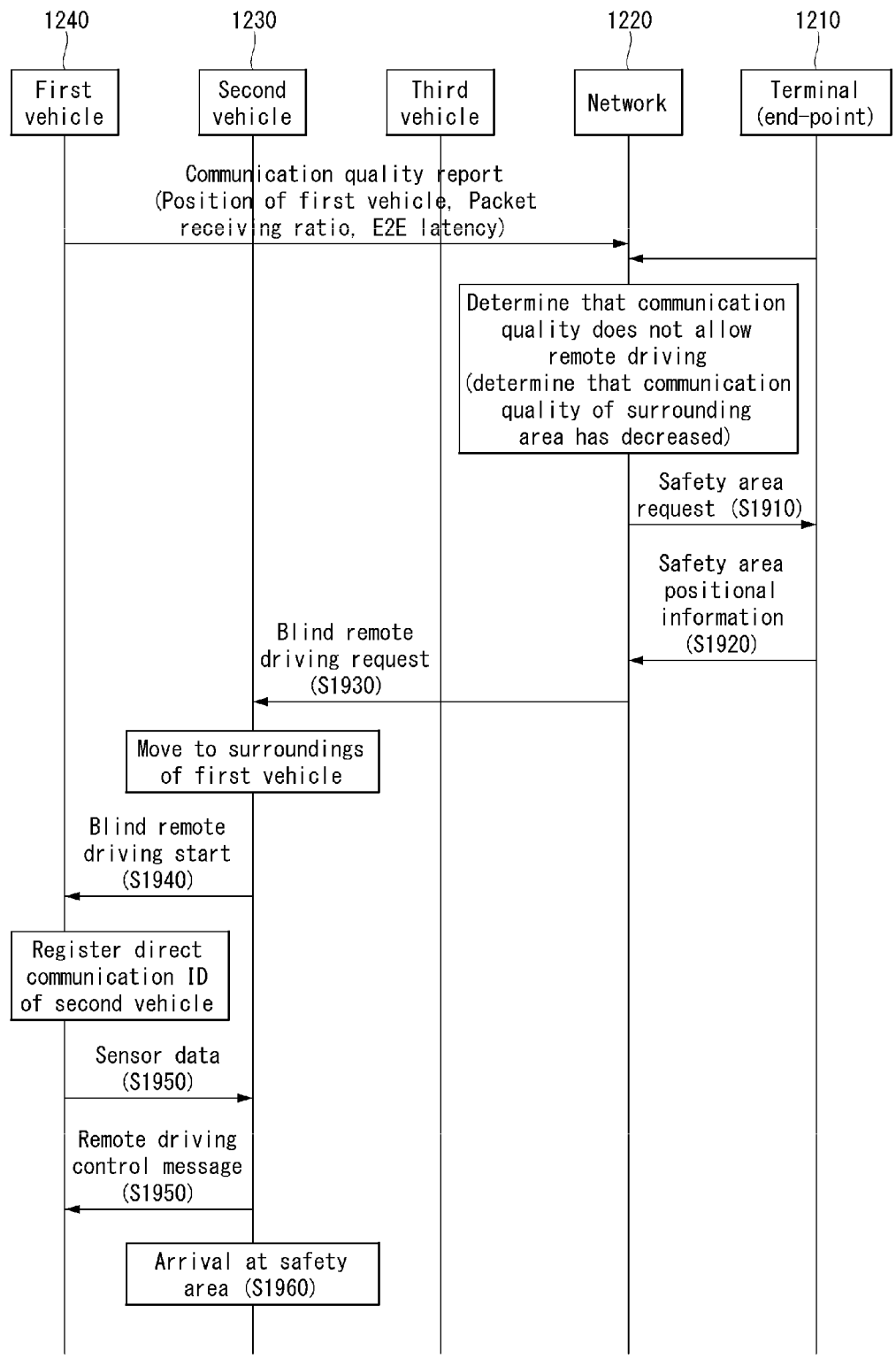

[FIG. 20]
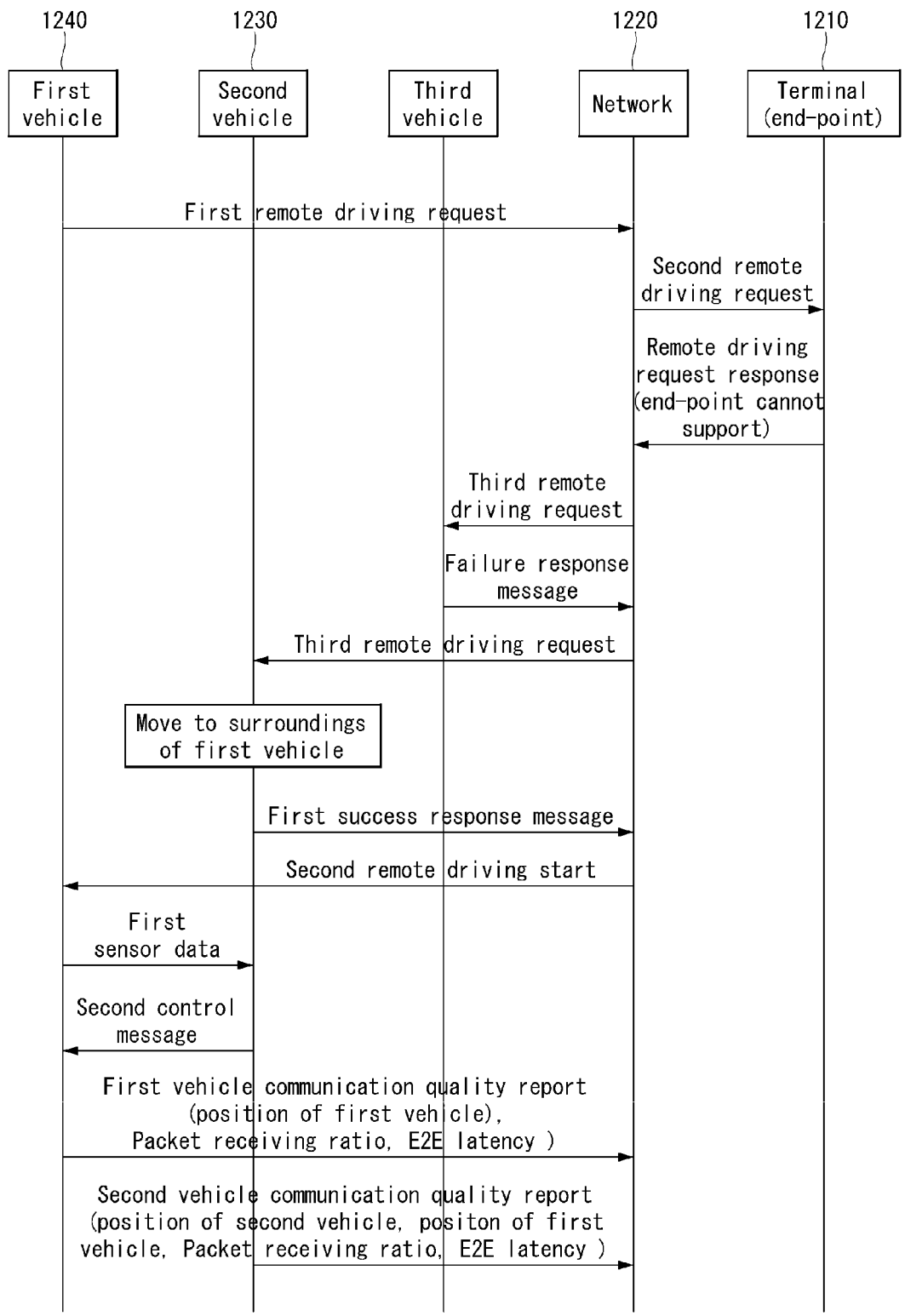

REMOTE DRIVING METHOD USING ANOTHER AUTONOMOUS VEHICLE IN AUTOMATED VEHICLE AND HIGH SYSTEMS

CROSS REFERENCE TO RELATED APPLICATIONS

This application is the National Phase of PCT/KR2019/007168 filed on Jun. 14, 2019, which is hereby expressly incorporated by reference into the present application.

BACKGROUND OF THE INVENTION

Field of the Invention

The present invention relates to automated vehicle & highway systems, and more particularly, to a remote driving method using another autonomous vehicle.

Related Art

Vehicles can be classified into an internal combustion engine vehicle, an external composition engine vehicle, a gas turbine vehicle, an electric vehicle, etc. according to types of motors used therefor.

An autonomous vehicle refers to a self-driving vehicle that can travel without an operation of a driver or a passenger, and automated vehicle & highway systems refer to systems that monitor and control the autonomous vehicle such that the autonomous vehicle can perform self-driving.

SUMMARY OF THE INVENTION

An object of the present invention is to provide a remote driving method using another autonomous vehicle in automated vehicle & highway systems.

Another object of the present invention is to provide a remote driving method using sensor data of another autonomous vehicle in automated vehicle & highway systems.

It will be appreciated by persons skilled in the art that the objects that could be achieved with the present invention are not limited to what has been particularly described hereinabove and the above and other objects that the present invention could achieve will be more clearly understood from the following detailed description.

In one aspect of the present invention, a remote driving method using another autonomous device of a network in automated vehicle & highway systems includes: transmitting, to a second device, a remote driving request message, when a message indicating impossibility of communication between a first device and a terminal connected to the network is received from the terminal; receiving, from the second device, a success response message for establishment of communication for remote driving of the first device; and transmitting, to the first device, a remote driving start message, wherein the remote driving request message may include positional information of the first device, and the second device may move on the basis of the positional information and traces the first device.

Further, the remote driving method may further include receiving a failure response message as a response to the remote driving request message if the second device is not able to move on the basis of the positional information of the first device or fails in tracing the first device.

Further, the remote driving request message may include a direct communication identifier of the first device, and the first device may be traced using the direct communication identifier of the first device through a direct communication method.

Further, the remote driving request message may include a direct communication identifier of the second device, and the remote driving method may further include transmitting sensor data by the first device to the second device using the direct communication identifier of the second device.

Further, the remote driving method may further include transmitting, by the second device, a control message for remote driving to the first device on the basis of the sensor data.

In another aspect of the present invention, a remote driving method using another autonomous device of a network in automated vehicle & highway systems includes: transmitting, to a second device, a message for requesting sensor support, when a message indicating that first sensor data received by a terminal from a first device is not valid is received from the terminal connected to the network; receiving, from the second device, a success response message as a response to the message for requesting sensor support; and transmitting, to the terminal, the success response message, wherein the second device may transmit, to the terminal, second sensor data capable of supporting a sensor indicated by the message indicating that the first sensor data is not valid.

Further, the message for requesting sensor support may include an Internet protocol (IP) address of the terminal, and the second device may be connected to the terminal which is the same as the first device using the IP address.

Further, the message for requesting sensor support may include positional information and driving direction information of the first device, and the second device may move to a position for generating the valid second sensor data on the basis of the positional information and the driving direction information.

Further, the terminal may determine whether the second sensor data is valid, and when the second sensor data is determined to be invalid, the network may receive the message representing that the first sensor data is not valid again.

Further, the terminal may determine whether the second sensor data is valid, and based on the second sensor data determined to be valid, the terminal may complement the first sensor data using the second sensor data.

In another aspect of the present invention, a remote driving method using another autonomous device of a network in automated vehicle & highway systems includes: transmitting, to a terminal, a message for requesting information about an area having communication quality allowing remote driving for the first device when it is determined that remote driving for the first device is not possible through a communication quality report received from the first device; receiving, from the terminal, area information as a response to the message for requesting information about an area having communication quality allowing remote driving for the first device; and transmitting, to a second device, a remote driving request message, wherein the second device may move the first device on the basis of the area information through remote driving.

Further, the area information may have priority based on positional information of the first device.

Further, the first device and the second device may communicate with at least one of a mobile terminal, the network and an autonomous vehicle other than the first device and the second device.

According to an embodiment of the present invention, remote driving can be performed using another autonomous vehicle in automated vehicle & highway systems.

In addition, according to an embodiment of the present invention, remote driving can be performed using sensor data of another autonomous vehicle.

It will be appreciated by persons skilled in the art that the effects that could be achieved with the present invention are not limited to what has been particularly described hereinabove and the above and other effects that the present invention could achieve will be more clearly understood from the following detailed description.

BRIEF DESCRIPTION OF THE DRAWINGS

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an autonomous vehicle and a 5G network in a 5G communication system.

FIG. 4 shows an example of a basic operation between vehicles using 5G communication.

FIG. 5 illustrates a vehicle according to an embodiment of the present invention.

FIG. 6 is a control block diagram of the vehicle according to an embodiment of the present invention.

FIG. 7 is a control block diagram of an autonomous device according to an embodiment of the present invention.

FIG. 8 is a diagram showing a signal flow in an autonomous vehicle according to an embodiment of the present invention.

FIG. 9 is a diagram illustrating the interior of a vehicle according to an embodiment of the present invention.

FIG. 10 is a block diagram referred to in description of a cabin system for a vehicle according to an embodiment of the present invention.

FIG. 11 is a diagram referred to in description of a usage scenario of a user according to an embodiment of the present invention.

FIG. 12 shows an automated vehicle & highway system to which the present invention is applicable.

FIG. 13 shows an embodiment of remote driving in an automated vehicle & highway system to which the present invention is applicable.

FIG. 14 shows a remote driving method of a network according to an embodiment of the present invention.

FIG. 15 shows a remote driving method according to an embodiment of the present invention.

FIG. 16 shows a remote driving method of a network according to an embodiment of the present invention.

FIG. 17 shows a remote driving method according to an embodiment of the present invention.

FIG. 18 shows a remote driving method of a network according to an embodiment of the present invention.

FIG. 19 shows a remote driving method according to an embodiment of the present invention.

FIG. 20 shows a remote driving method according to an embodiment of the present invention.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a base station (BS) (S201). For this operation, the UE can receive a primary synchronization channel (P-SCH) and a secondary synchronization channel (S-SCH) from the BS to synchronize with the BS and acquire information such as a cell ID. In LTE and new radio (NR) systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of a single-sideband modulation (SSB). The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

H. Autonomous Driving Operation Between Vehicles Using 5G Communication

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology can be combined with methods proposed in the present invention which will be described later and applied or can complement the methods proposed in the present invention to make technical features of the methods concrete and clear.

Driving (1) Exterior of Vehicle

FIG. 5 is a diagram showing a vehicle according to an embodiment of the present invention.

Referring to FIG. 5, a vehicle 10 according to an embodiment of the present invention is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

FIG. 6 is a control block diagram of the vehicle according to an embodiment of the present invention.

Referring to FIG. 6, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3 Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE (Institute of Electrical and Electronics Engineers) 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present invention can exchange signals with external devices using only one of C-V2X and DSRC. Alternatively, the communication device of the present invention can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

FIG. 7 is a control block diagram of the autonomous device according to an embodiment of the present invention.

Referring to FIG. 7, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

FIG. 8 is a diagram showing a signal flow in an autonomous vehicle according to an embodiment of the present invention.

1) Reception Operation

Referring to FIG. 8, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Cabin

FIG. 9 is a diagram showing the interior of the vehicle according to an embodiment of the present invention. FIG. 10 is a block diagram referred to in description of a cabin system for a vehicle according to an embodiment of the present invention.

(1) Components of Cabin

Referring to FIGS. 9 and 10, a cabin system 300 for a vehicle (hereinafter, a cabin system) can be defined as a convenience system fora user who uses the vehicle 10. The cabin system 300 can be explained as a high-end system including a display system 350, a cargo system 355, a seat system 360 and a payment system 365. The cabin system 300 may include a main controller 370, a memory 340, an interface 380, a power supply 390, an input device 310, an imaging device 320, a communication device 330, the display system 350, the cargo system 355, the seat system 360 and the payment system 365. The cabin system 300 may further include components in addition to the components described in this specification or may not include some of the components described in this specification according to embodiments.

1) Main Controller

The main controller 370 can be electrically connected to the input device 310, the communication device 330, the display system 350, the cargo system 355, the seat system 360 and the payment system 365 and exchange signals with these components. The main controller 370 can control the input device 310, the communication device 330, the display system 350, the cargo system 355, the seat system 360 and the payment system 365. The main controller 370 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may be configured as at least one sub-controller. The main controller 370 may include a plurality of sub-controllers according to an embodiment. The plurality of sub-controllers may individually control the devices and systems included in the cabin system 300. The devices and systems included in the cabin system 300 may be grouped by function or grouped on the basis of seats on which a user can sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 can receive signals, information or data from a user terminal through the communication device 330. The user terminal can transmit signals, information or data to the cabin system 300.

The processor 371 can identify a user on the basis of image data received from at least one of an internal camera and an external camera included in the imaging device. The processor 371 can identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information and use history information of a user.

The main controller 370 may include an artificial intelligence (AI) agent 372. The AI agent 372 can perform machine learning on the basis of data acquired through the input device 310. The AI agent 371 can control at least one of the display system 350, the cargo system 355, the seat system 360 and the payment system 365 on the basis of machine learning results.

2) Essential Components

The memory 340 is electrically connected to the main controller 370. The memory 340 can store basic data about units, control data for operation control of units, and input/output data. The memory 340 can store data processed in the main controller 370. Hardware-wise, the memory 340 may be configured using at least one of a ROM, a RAM, an EPROM, a flash drive and a hard drive. The memory 340 can store various types of data for the overall operation of the cabin system 300, such as a program for processing or control of the main controller 370. The memory 340 may be integrated with the main controller 370.

The interface 380 can exchange signals with at least one electronic device included in the vehicle 10 in a wired or wireless manner. The interface 380 may be configured using at least one of a communication module, a terminal, a pin, a cable, a port, a circuit, an element and a device.

The power supply 390 can provide power to the cabin system 300. The power supply 390 can be provided with power from a power source (e.g., a battery) included in the vehicle 10 and supply the power to each unit of the cabin system 300. The power supply 390 can operate according to a control signal supplied from the main controller 370. For example, the power supply 390 may be implemented as a switched-mode power supply (SMPS).

The cabin system 300 may include at least one printed circuit board (PCB). The main controller 370, the memory 340, the interface 380 and the power supply 390 may be mounted on at least one PCB.

3) Input Device

The input device 310 can receive a user input. The input device 310 can convert the user input into an electrical signal. The electrical signal converted by the input device 310 can be converted into a control signal and provided to at least one of the display system 350, the cargo system 355, the seat system 360 and the payment system 365. The main controller 370 or at least one processor included in the cabin system 300 can generate a control signal based on an electrical signal received from the input device 310.

The input device 310 may include at least one of a touch input unit, a gesture input unit, a mechanical input unit and a voice input unit. The touch input unit can convert a user's touch input into an electrical signal. The touch input unit may include at least one touch sensor for detecting a user's touch input. According to an embodiment, the touch input unit can realize a touch screen by integrating with at least one display included in the display system 350. Such a touch screen can provide both an input interface and an output interface between the cabin system 300 and a user. The gesture input unit can convert a user's gesture input into an electrical signal. The gesture input unit may include at least one of an infrared sensor and an image sensor for detecting a user's gesture input. According to an embodiment, the gesture input unit can detect a user's three-dimensional gesture input. To this end, the gesture input unit may include a plurality of light output units for outputting infrared light or a plurality of image sensors. The gesture input unit may detect a user's three-dimensional gesture input using TOF (Time of Flight), structured light or disparity. The mechanical input unit can convert a user's physical input (e.g., press or rotation) through a mechanical device into an electrical signal. The mechanical input unit may include at least one of a button, a dome switch, a jog wheel and a jog switch. Meanwhile, the gesture input unit and the mechanical input unit may be integrated. For example, the input device 310 may include a jog dial device that includes a gesture sensor and is formed such that it can be inserted/ejected into/from a part of a surrounding structure (e.g., at least one of a seat, an armrest and a door). When the jog dial device is parallel to the surrounding structure, the jog dial device can serve as a gesture input unit. When the jog dial device is protruded from the surrounding structure, the jog dial device can serve as a mechanical input unit. The voice input unit can convert a user's voice input into an electrical signal. The voice input unit may include at least one microphone. The voice input unit may include a beam forming microphone.

4) Imaging Device

The imaging device 320 can include at least one camera. The imaging device 320 may include at least one of an internal camera and an external camera. The internal camera can capture an image of the inside of the cabin. The external camera can capture an image of the outside of the vehicle. The internal camera can acquire an image of the inside of the cabin. The imaging device 320 may include at least one internal camera. It is desirable that the imaging device 320 include as many cameras as the number of passengers who can ride in the vehicle. The imaging device 320 can provide an image acquired by the internal camera. The main controller 370 or at least one processor included in the cabin system 300 can detect a motion of a user on the basis of an image acquired by the internal camera, generate a signal on the basis of the detected motion and provide the signal to at least one of the display system 350, the cargo system 355, the seat system 360 and the payment system 365. The external camera can acquire an image of the outside of the vehicle. The imaging device 320 may include at least one external camera. It is desirable that the imaging device 320 include as many cameras as the number of doors through which passengers ride in the vehicle. The imaging device 320 can provide an image acquired by the external camera. The main controller 370 or at least one processor included in the cabin system 300 can acquire user information on the basis of the image acquired by the external camera. The main controller 370 or at least one processor included in the cabin system 300 can authenticate a user or acquire body information (e.g., height information, weight information, etc.), fellow passenger information and baggage information of a user on the basis of the user information.

5) Communication Device

The communication device 330 can exchange signals with external devices in a wireless manner. The communication device 330 can exchange signals with external devices through a network or directly exchange signals with external devices. External devices may include at least one of a server, a mobile terminal and another vehicle. The communication device 330 may exchange signals with at least one user terminal. The communication device 330 may include an antenna and at least one of an RF circuit and an RF element which can implement at least one communication protocol in order to perform communication. According to an embodiment, the communication device 330 may use a plurality of communication protocols. The communication device 330 may switch communication protocols according to a distance to a mobile terminal.

For example, the communication device can exchange signals with external devices on the basis of C-V2X (Cellular V2X). For example, C-V2X may include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present invention can exchange signals with external devices using only one of C-V2X and DSRC. Alternatively, the communication device of the present invention can exchange signals with external devices using a hybrid of C-V2X and DSRC.

6) Display System

The display system 350 can display graphic objects. The display system 350 may include at least one display device. For example, the display system 350 may include a first display device 410 for common use and a second display device 420 for individual use.

6.1) Common Display Device

The first display device 410 may include at least one display 411 which outputs visual content. The display 411 included in the first display device 410 may be realized by at least one of a flat panel display, a curved display, a rollable display and a flexible display. For example, the first display device 410 may include a first display 411 which is positioned behind a seat and formed to be inserted/ejected into/from the cabin, and a first mechanism for moving the first display 411. The first display 411 may be disposed such that it can be inserted/ejected into/from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images can be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 and the second display device 420. The processor included in the display system 350 can generate a control signal on the basis of a signal received from at last one of the main controller 370, the input device 310, the imaging device 320 and the communication device 330.

A display area of a display included in the first display device 410 may be divided into a first area 411a and a second area 411b. The first area 411a can be defined as a content display area. For example, the first area 411 may display at least one of graphic objects corresponding to can display entertainment content (e.g., movies, sports, shopping, food, etc.), video conferences, food menu and augmented reality screens. The first area 411a may display graphic objects corresponding to traveling situation information of the vehicle 10. The traveling situation information may include at least one of object information outside the vehicle, navigation information and vehicle state information. The object information outside the vehicle may include information on presence or absence of an object, positional information of an object, information on a distance between the vehicle and an object, and information on a relative speed of the vehicle with respect to an object. The navigation information may include at least one of map information, information on a set destination, route information according to setting of the destination, information on various objects on a route, lane information and information on the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b can be defined as a user interface area. For example, the second area 411b may display an AI agent screen. The second area 411b may be located in an area defined by a seat frame according to an embodiment. In this case, a user can view content displayed in the second area 411b between seats. The first display device 410 may provide hologram content according to an embodiment. For example, the first display device 410 may provide hologram content for each of a plurality of users such that only a user who requests the content can view the content.

6.2) Display Device for Individual Use

The second display device 420 can include at least one display 421. The second display device 420 can provide the display 421 at a position at which only an individual passenger can view display content. For example, the display 421 may be disposed on an armrest of a seat. The second display device 420 can display graphic objects corresponding to personal information of a user. The second display device 420 may include as many displays 421 as the number of passengers who can ride in the vehicle. The second display device 420 can realize a touch screen by forming a layered structure along with a touch sensor or being integrated with the touch sensor. The second display device 420 can display graphic objects for receiving a user input for seat adjustment or indoor temperature adjustment.

7) Cargo System

The cargo system 355 can provide items to a user at the request of the user. The cargo system 355 can operate on the basis of an electrical signal generated by the input device 310 or the communication device 330. The cargo system 355 can include a cargo box. The cargo box can be hidden in a part under a seat. When an electrical signal based on user input is received, the cargo box can be exposed to the cabin. The user can select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 can provide a user customized seat to a user. The seat system 360 can operate on the basis of an electrical signal generated by the input device 310 or the communication device 330. The seat system 360 can adjust at least one element of a seat on the basis of acquired user body data. The seat system 360 may include a user detection sensor (e.g., a pressure sensor) for determining whether a user sits on a seat. The seat system 360 may include a plurality of seats on which a plurality of users can sit. One of the plurality of seats can be disposed to face at least another seat. At least two users can set facing each other inside the cabin.

9) Payment System

The payment system 365 can provide a payment service to a user. The payment system 365 can operate on the basis of an electrical signal generated by the input device 310 or the communication device 330. The payment system 365 can calculate a price for at least one service used by the user and request the user to pay the calculated price.

(2) Autonomous Vehicle Usage Scenarios

FIG. 11 is a diagram referred to in description of a usage scenario of a user according to an embodiment of the present invention.

1) Destination Prediction Scenario

A first scenario S111 is a scenario for prediction of a destination of a user. An application which can operate in connection with the cabin system 300 can be installed in a user terminal. The user terminal can predict a destination of a user on the basis of user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user on the basis of acquired body information.

5) Personal Content Provision Scenario

A fifth scenario S115 is a personal content provision scenario. The display system 350 can receive user personal data through the input device 310 or the communication device 330. The display system 350 can provide content corresponding to the user personal data.

6) Item Provision Scenario

A sixth scenario S116 is an item provision scenario. The cargo system 355 can receive user data through the input device 310 or the communication device 330. The user data may include user preference data, user destination data, etc. The cargo system 355 can provide items on the basis of the user data.

7) Payment Scenario

A seventh scenario S117 is a payment scenario. The payment system 365 can receive data for price calculation from at least one of the input device 310, the communication device 330 and the cargo system 355. The payment system 365 can calculate a price for use of the vehicle by the user on the basis of the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed content on the basis of the electrical signal.

9) AI Agent Scenario

A ninth scenario S119 is a multi-channel artificial intelligence (AI) agent scenario for a plurality of users. The AI agent 372 can discriminate user inputs from a plurality of users. The AI agent 372 can control at least one of the display system 350, the cargo system 355, the seat system 360 and the payment system 365 on the basis of electrical signals obtained by converting user inputs from a plurality of users.

10) Multimedia Content Provision Scenario for Multiple Users

A tenth scenario S120 is a multimedia content provision scenario fora plurality of users. The display system 350 can provide content that can be viewed by all users together. In this case, the display system 350 can individually provide the same sound to a plurality of users through speakers provided for respective seats. The display system 350 can provide content that can be individually viewed by a plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle on the basis of the data about the belongings and the motion data. The main controller 370 can control an alarm with respect to the belongings to be output through the display system 350.

13) A Lighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data can include data about a total charge for using the vehicle 10.

The above-describe 5G communication technology can be combined with methods proposed in the present invention which will be described later and applied or can complement the methods proposed in the present invention to make technical features of the present invention concrete and clear.

Hereinafter, various embodiments of the present invention will be described in detail with reference to the attached drawings.

FIG. 12 illustrates an automated vehicle & highway system to which the present invention is applicable. Components of the automated vehicle & highway system will be described below with reference to FIG. 12.

The automated vehicle & highway system to which the present invention is applicable includes a network 1220, autonomous vehicles 1240 and 1230, and an end-point 1210.

The end-point 1210 refers to any device which can be connected to the network 1220. The end-point 1210 may include remote, wireless or mobile devices such as a server, a laptop computer, a tablet and a cellular phone and may be replaced by a terminal. In the present invention, the end-point 1210 can manage the automated vehicle & highway system and issue orders to autonomous vehicles connected through the network 1220. Such an operation can be automatically performed through computer operation or performed according to an operation value received from a user. A plurality of end-points 1210 may be used and a single end-point 1210 may control a plurality of autonomous vehicles according to automated vehicle & highway system design.

The network 1220 used in the automated vehicle & highway system according to the present invention includes a 5G network and may be a network having a further enhanced communication system. A vehicle to which the present invention is applied includes vehicles to which autonomous driving technology is applied and may be a mobile device having a further enhanced technology. In embodiments which will be described later, a plurality of disabled vehicles 1240 (referred to as "first devices" or "first vehicles" in the present invention) which requires remote driving using autonomous vehicles may be present, and a plurality of vehicles 1230 (referred to as "second devices" or "second vehicles" in the present invention) which remotely drives such disabled vehicles may be present. Remote driving vehicles may have a one-to-on relationship, one-to-many or many-to-one relationship with disabled vehicles. In addition, the second vehicle 1230 may be a special vehicle (e.g., an ambulance, a police car, a fire truck, or the like), and the automated vehicle & highway system of the present invention may be configured such that only a remote driving method using such a special vehicle is possible.

FIG. 13 shows an embodiment of remote driving in the automated vehicle & and highway system to which the present invention is applicable.

First, the first vehicle 1240 transmits a first remote driving request message to the network 1220 to which the first vehicle 1240 can be connected (S1310). A remote driving request can be automatically started when a specific event set in the first vehicle 1240 occurs. Alternatively, the remote driving request may be started at the request of a server, a user or a neighboring autonomous vehicle. The first remote driving request message may include the IP address and positional information of the first vehicle 1240, sensor information of the first vehicle 1240, and an identifier (ID) for direct communication with other autonomous vehicles. This information can be stored and managed for each autonomous vehicle in the network 1220. The first vehicle 1240 may transmit the first remote driving request message at specific intervals until a response is received from the network 1220.

Upon reception of the first remote driving request message, the network 1220 transmits a second remote driving request message to the end-point 1210 connected thereto (S1320). The second remote driving request message may include information delivered through the first remote driving request message.

The end-point 1210 transmits a response message to the second remote driving request message to the network 1220 (S1330). The end-point 1210 determines whether remote driving of the first vehicle 1240 can be performed on the basis of the second remote driving request message. When it is determined that remote driving can be performed, the end-point 1210 transmits a response message including information indicating that the remote driving request has been accepted to the network 1220. This response message includes an IP address of the end-point 1210 which can be used for the first vehicle 1240 to communicate with the end-point 1210.

The network 1220 transmits a first remote driving start message to the first vehicle 1240 (S1340). The network 1220 can include the IP address of the end-point 1210 included in the response message received from the end-point 1210 in the first remote driving start message and transmit the first remote driving start message including the IP address to the first vehicle 1240. The first vehicle 1240 can communicate with the end-point 1210 using the received IP address of the end-point 1210.

The end-point 1210 transmits a first control message for remote driving to the first vehicle 1240 (S1350). The first vehicle 1240 transmits acquired first sensor data to the end-point 1210 (S1360). The end-point 1210 transmits the first control message to the first vehicle 1240 again on the basis of the transmitted first sensor data and causes remote driving with respect to the first vehicle 1240 to continue through such repeated control signaling. In the present invention, the first control message is a control message used for the end-point 1210 to perform remote driving of the first vehicle 1240, and a second control message which will be described later is a control message for remote driving of the first vehicle 1240 using another autonomous vehicle.

Hereinafter, an embodiment to which the present invention is applicable when a remote driving operation performed through the end-point 1210 has a failure will be described with reference to FIGS. 14 to 20. This embodiment is applicable after the operation of the automated vehicle & highway system illustrated in FIG. 13 or during preparation of this operation.

FIG. 14 shows a remote driving method of a network according to an embodiment of the present invention. FIG. 14 illustrates an operation of the network 1220 in a remote driving method using the second vehicle 1230 when a communication impossibility event occurs between the first vehicle 1240 and the end-point 1210.

The network 1220 receives a message indicating impossibility of communication with the first vehicle 1240 from the end-point 1210. The network 1220 transmits a message for requesting remote driving to a connected autonomous vehicle around the first vehicle 1240 on the basis of the positional information of the first vehicle 1240 (S1410).

The second vehicle 1230 which has received this message establishes communication for remote driving of the first vehicle 1240, and when communication establishment has been successfully performed, a success response message is received from the second vehicle 1230 as a response to the remote driving request message (S1420).

The network 1220 transmits a message for remote driving start to the first vehicle 1240 (S1430).

FIG. 15 shows a remote driving method according to an embodiment of the present invention. FIG. 15 illustrates a remote driving method using the second vehicle 1230 when a communication impossibility event occurs between the first vehicle 1240 and the end-point 1210.

When the end-point 1210 determines that communication with the first vehicle 1240 is unavailable, the end-point 1210 transmits a message indicating impossibility of communication to the network 1220 (S1510). The message indicating impossibility of communication includes a most recently transmitted IP address and positional information of the first vehicle 1240.

The network 1220 transmits a third remote driving request message to other autonomous vehicles connected thereto (S1520). The third remote driving request message can be sequentially transmitted from the position of the first vehicle to neighboring autonomous vehicles from the closest autonomous vehicle on the basis of the positional information of the first vehicle. The aforementioned message includes a direct communication identifier (ID) of the first vehicle 1240 and most recently transmitted positional information of the first vehicle 1240.

A third vehicle which has received the third remote driving request message moves to the surroundings of the first vehicle 1240 on the basis of the positional information of the first vehicle 1240. When the third vehicle starts to move or is moving or after movement of the third vehicle ends, the third vehicle searches for the direct communication ID of the first vehicle 1240 through a direct communication method. When the third vehicle cannot move to the surroundings of the first vehicle 1240 or fails in searching for the direct communication ID of the first vehicle 1240, the third vehicle transmits a third remote driving request failure response message indicating that remote driving is impossible (S1530).

When the second vehicle 1230 moved to the surroundings of the first vehicle 1240 has successfully searched for the direct communication ID of the first vehicle 1240 through direct communication, the second vehicle 1230 transmits a first success response message to the network 1220 (S1540). The first success response message includes a direct communication ID of the second vehicle 1230 which is used for direct communication with the first vehicle 1240.

Upon reception of the first success response message, the network 1220 transmits a second remote driving start message to the first vehicle 1240 (S1550). The second remote driving start message includes the direct communication ID of the second vehicle 1230.

The first vehicle 1240 transmits first sensor data to the second vehicle 1230 through direct communication using the direct communication ID of the second vehicle 1230 (S1560), and the second vehicle 1230 transmits the second control message for remote driving to the first vehicle 1240 through direct communication on the basis of the received first sensor data (S1570). Here, the direct communication ID of the first vehicle 1230 is used for direct communication of the second vehicle 1230 with the first vehicle 1240.

FIG. 16 is a remote driving method of a network according to an embodiment of the present invention. FIG. 16 illustrates an operation of the network 1220 in a remote driving method using second sensor data of the second vehicle 1230 when the first sensor data of the first vehicle 1240 is not valid.

When the end-point 1210 determines that the received first sensor data is not valid data for remote driving, the end-point 1210 identifies types of sensors which generate invalid sensor data and the network 1220 receives a message including information on invalid sensors and indicating that the first sensor data is not valid. The network 1220 transmits a message for requesting sensor support of the first vehicle 1240 to other autonomous vehicles on the basis of the received message (S1610).

The second vehicle 1230 which has received the message for requesting sensor support of the first vehicle 1240 transmits a response message to the received message to the network 1220. When the second vehicle 1230 can approach the first vehicle 1240 and transmit sensor data about a sensor necessary for the end-point 1210, the network 1220 receives a success response message from the second vehicle 1230 (S1620).

The network 1220 transmits the success response message to the end-point 1210 for communication between the end-point 1210 and the second vehicle 1230 (S1630).

FIG. 17 shows a remote driving method according to an embodiment of the present invention. FIG. 17 illustrates a remote driving method using the second sensor data of the second vehicle 1230 when the first sensor data of the first vehicle 1240 is not valid.

When the end-point 1210 determines that the first sensor data received from the first vehicle 1240 is not valid, the end-point 1210 identifies the type of invalid sensor data and transmits sensor invalidity data indicating the type of invalid sensor data (S1710). The sensor invalidity data includes a most recently transmitted IP address and positional information of the first vehicle 1240.

The network 1220 transmits, to the second vehicle 1230, a sensor support request message for requesting support of invalid sensor data of the first vehicle 1240 (S1720). The message includes the direct communication ID of the first vehicle 1240, most recently transmitted positional information of the first vehicle 1240, and the IP address of the end-point 1210, and when the network 1220 is aware of a driving direction of the first vehicle 1240 according to calculation of the driving direction through change in the positional information of the first vehicle 1240, the network 1220 can also transmit information on the driving direction to the second vehicle 1230. Here, the second vehicle 1230 can be connected to the same end-point 1210 to which the first vehicle 1240 is connected using the IP address of the end-point 1210 included in the sensor support request message even when the second vehicle 1230 is controlled by another end-point 1210 or manually travels.

The second vehicle 1230 which has received the sensor support request message moves to the surroundings of the first vehicle 1240 on the basis of the positional information of the first vehicle 1240. Here, the second vehicle 1230 needs to move to an appropriate position in order to support invalid sensor data in the first vehicle 1240. To this end, driving direction information of the first vehicle 1240 as well as the positional information thereof can also be used. When the second vehicle starts to move or is moving or after movement of the second vehicle ends, the second vehicle searches for the direct communication ID of the first vehicle 1240 through a direct communication method. When the second vehicle 1230 has successfully searched for the direct communication ID of the first vehicle 1240 through direct communication, the second vehicle 1230 transmits a second success response message to the network 1220, and the network 1220 transmits the second success response message to the end-point 1210 (S1730). Distinguished from the first success response message, the second success response message includes an IP address of the second vehicle 1230 which is used for communication between the end-point 1210 and the second vehicle 1230 through the network 1220.

The second vehicle 1230 transmits, to the end-point 1210, second sensor data which can support sensor data determined to be invalid in the first vehicle 1240 on the basis of the sensor support request message (S1740).

The end-point 1210 compares the received second sensor data with the previously received first sensor data to determine whether the second sensor data is valid. If the second sensor data is not valid, the procedure is performed again from step S1710 of transmitting the sensor invalidity message.

If the second sensor data is valid, the end-point 1210 can complement the invalid first sensor data using the second sensor data and transmit the second control message to the first vehicle 1240, and thus remote driving of the first vehicle 1240 can be continuously performed (S1750).

The first vehicle 1240 transmits third sensor data from which invalid sensor data has been excluded to the end-point 1210 (S1760). The second sensor data and the third sensor data are transmitted to the end-point 1210 at certain intervals, and the end-point 1210 performs remote driving on the basis of the second sensor data and the third sensor data.

FIG. 18 shows a remote driving method of a network according to an embodiment of the present invention. FIG. 18 illustrates an operation of the network 1220 in a remote driving method using the second vehicle 1230 when remote driving cannot be maintained due to deterioration of communication quality between the first vehicle 1240 and the network 1220.

A remote driving vehicle and a network may have communication quality that does not allow remote driving depending on the environment of an area that the remote driving vehicle enters. In this case, the end-point 1210 can move the remote driving vehicle to a safety area through remote driving using another autonomous vehicle on the basis of information on areas (referred to as safety areas in the present invention) having communication quality that allows safe remote driving.

When it is determined that communication quality does not allow remote driving with respect to the first vehicle 1240, the network 1220 transmits, to the end-point 1210, a message for requesting information on communication available areas (S1810).

The network 1220 receives information on communication available areas from the end-point 1210 as a response to the message for requesting the information on communication available areas (S1820) and transmits, to the second vehicle 1230, a remote driving request message for moving the first vehicle 1240 to a safety area through remote driving (S1830).

FIG. 19 shows a remote driving method according to an embodiment of the present invention. FIG. 19 illustrates a remote driving method using the second vehicle 1230 when remote driving cannot be maintained due to deterioration of communication quality between the first vehicle 1240 and the network 1220.

The first vehicle 1240 can periodically monitor communication quality between the first vehicle 1240 and the network 1220. In addition, the first vehicle 1240 can transmit a monitoring result to the network 1220 through a communication quality report. The communication quality report may include a packet receiving ratio in communication with the network 1220, information on E2E (End-to-End) latency, and the positional information of the first vehicle 1240.

When the network 1220 determines that communication quality does not allow normal remote driving of the first vehicle 1240 through the communication quality report, the network 1220 determines that communication quality in an area around the first vehicle 1240 has decreased on the basis of the positional information of the first vehicle 1240 and performs a control operation for moving the first vehicle 1240 to a safety area. Here, the safety area refers to an area having high communication quality which is ascertained by the network 1220 through the communication quality report. The safety area is stored in the end-point 1210 and may be regularly updated and managed.

Upon determining that communication quality does not allow remote driving, the network 1220 transmits a safety area request message to the end-point 1210 (S1910). The network 1220 may transmit the safety area request message along with the positional information of the first vehicle 1240.

The end-point 1210 transmits positional information about the safety area to the network 1220 (S1920). A plurality of pieces of positional information of safety areas may be provided, and information on a safety area closest to the first vehicle 1240 may be transmitted or a plurality of safety areas may be assigned priority orders and information thereon may be transmitted on the basis of the positional information of the first vehicle 1240.

The network 1220 transmits a blind remote driving request message to the second vehicle 1230 (S1930). A blind remote driving request is a remote driving request for the purpose of movement to a safety area due to deterioration of communication quality in an area around the first vehicle 1240, and the blind remote driving request message includes the direct communication ID of the first vehicle 1240, the positional information of the first vehicle 1240, and safety area positional information transmitted from the end-point 1210. Upon reception of the blind remote driving request message, the second vehicle 1230 moves to the surroundings of the first vehicle 1240 on the basis of the positional information of the first vehicle 1240 and searches for the direct communication ID of the first vehicle 1240.

When the second vehicle 1230 has successfully searched for the direct communication ID of the first vehicle 1240, the second vehicle 1230 transmits a blind remote driving start message to the first vehicle 1240 through direct communication (S1940). This message includes the direct communication ID of the second vehicle 1230. The first vehicle 1240 registers the received direct communication ID of the second vehicle 1230 and performs remote driving by transmitting sensor data and receiving remote driving control message to and from the second vehicle 1230 through the direct communication ID of the second vehicle 1230 (S1950).

When the second vehicle 1230 determines that the first vehicle 1240 has arrived at the safety area (S1960), the first vehicle 1240 starts remote driving through the end-point 1210, to which the embodiment illustrated in FIG. 13 is applicable.

FIG. 20 shows a remote driving method according to an embodiment of the present invention. FIG. 20 illustrates a remote driving method using the second vehicle 1230 when there is no end-point 1210 that can support remote driving although the first vehicle 1240 requests remote driving to be performed by the end-point 1210.

The end-point 1210 includes an end-point support impossibility message in a response message to a remote driving request and transmits the response message. If the network 1220 receives the remote driving request response message including the end-point support impossibility message from the end-point 1210, the network 1220 can request that remote driving of the first vehicle 1240 be performed by a neighboring vehicle. In this case, the remote driving method illustrated in FIG. 7 can be applied.

Additionally, the first vehicle 1240 and the second vehicle 1230 can transmit, to the network 1220, communication quality reports including communication quality monitoring information. These communication quality reports may include positional information of the first vehicle 1240 and the second vehicle 1230, and the network 1220 can use the communication quality reports to maintain stability of remote driving using the second vehicle 1230.

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

Furthermore, although the invention has been described with reference to the exemplary embodiments, those skilled in the art will appreciate that various modifications and variations can be made in the present invention without departing from the spirit or scope of the invention described in the appended claims. For example, each component described in detail in embodiments can be modified. In addition, differences related to such modifications and applications should be interpreted as being included in the scope of the present invention defined by the appended claims.

Although description has been made focusing on examples in which the present invention is applied to automated vehicle & highway systems based on 5G (5 generation) system, the present invention is also applicable to various wireless communication systems and autonomous devices.

What is claimed is:

1. A remote driving method using another autonomous device of a network in automated vehicle & highway systems, the remote driving method comprising:
transmitting, by the network to a second device, a message for requesting sensor support, when a first message indicating that first sensor data received by a terminal from a first device is not valid is received from the terminal which is connected to the network and independent of the first and second devices;
receiving, by the network from the second device, a success response message as a response to the message for requesting sensor support; and
transmitting, by the network to the terminal, the success response message,
wherein the message for requesting sensor support includes positional information and driving direction information of the first device, and
wherein the second device moves, based on the positional information and the driving direction information, to a position for generating second sensor data capable of supporting a sensor indicated by the first message and transmits the second sensor data to the terminal.

2. The remote driving method of claim 1, wherein the message for requesting sensor support includes an Internet protocol (IP) address of the terminal, and the second device is connected to the terminal using the IP address.

3. The remote driving method of claim 1, wherein the terminal determines whether the second sensor data is valid, and when the second sensor data is determined to be invalid, the network receives the first message representing that the first sensor data is not valid again.

4. The remote driving method of claim 1, wherein the terminal determines whether the second sensor data is valid, and complements the first sensor data using the second sensor data determined to be valid.

5. The remote driving method of claim 1, wherein the first device and the second device communicate with at least one of a mobile terminal, the network and an autonomous vehicle other than the first device and the second device.

6. An automated vehicle system for remote driving, comprising:
a network having a communication system;
a first vehicle connected to the network;
a second vehicle connected to the network; and
a terminal connected to the network and independent of the first and second vehicles,
wherein the network is configured to:
transmit a message for requesting sensor support to the second vehicle when receiving from the terminal a first message indicating that first sensor data which the terminal receives from the first vehicle is not valid;
receive from the second vehicle a success response message as a response to the message for requesting sensor support; and
transmit the success response message to the terminal,
wherein the message for requesting sensor support includes positional information and driving direction information of the first vehicle, and
wherein the second vehicle moves, based on the positional information and the driving direction information, to a position for generating second sensor data capable of supporting a sensor indicated by the first message and transmits the second sensor data to the terminal.

7. The automated vehicle system of claim 6, the message for requesting sensor support includes an Internet protocol (IP) address of the terminal, and the second vehicle is connected to the terminal using the IP address.

8. The automated vehicle system of claim 6, wherein the terminal determines whether the second sensor data is valid, and the network receives the first message representing that the first sensor data is not valid again when the second sensor data is determined to be invalid.

9. The automated vehicle system of claim 6, wherein the terminal determines whether the second sensor data is valid, and complements the first sensor data using the second sensor data determined to be valid.

* * * * *